(12) United States Patent
Keskiniva et al.

(10) Patent No.: US 7,290,622 B2
(45) Date of Patent: Nov. 6, 2007

(54) IMPACT DEVICE WITH A ROTABLE CONTROL VALVE

(75) Inventors: Markku Keskiniva, Ylöjärvi (FI); Jorma Maki, Mutala (FI); Mauri Esko, Ikaalinen (FI); Erkki Ahola, Kangasala (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 11/206,811

(22) Filed: Aug. 19, 2005

(65) Prior Publication Data

US 2006/0032649 A1    Feb. 16, 2006

Related U.S. Application Data

(63) Continuation of application No. PCT/FI2004/000082, filed on Feb. 23, 2004.

(30) Foreign Application Priority Data

Feb. 21, 2003 (FI) .................................. 20030261

(51) Int. Cl.
   *B25D 9/00* (2006.01)
(52) U.S. Cl. ..................... 173/91; 173/200; 173/204; 173/202
(58) Field of Classification Search .......... 173/91, 173/200, 14, 204, 202, 212, 206, 9, 11
   See application file for complete search history.

(56) References Cited

U.S. PATENT DOCUMENTS

| | | | | |
|---|---|---|---|---|
| 3,296,853 A | * | 1/1967 | Beche | 72/453.01 |
| 4,159,039 A | * | 6/1979 | Kasuga et al. | 173/1 |
| 4,179,983 A | * | 12/1979 | Wallace | 92/85 B |
| 4,344,313 A | * | 8/1982 | Chachin et al. | 72/453.1 |
| 4,690,225 A | * | 9/1987 | Tupitsyn et al. | 173/200 |
| 5,802,966 A | * | 9/1998 | Schoch | 100/35 |
| 6,854,538 B2 | * | 2/2005 | Muuttonen | 175/414 |
| 7,013,966 B2 | * | 3/2006 | Takano et al. | 165/202 |
| 2004/0134254 A1 | * | 7/2004 | Dahlberg | 72/435 |

FOREIGN PATENT DOCUMENTS

| | | |
|---|---|---|
| DE | 2 206 014 | 8/1973 |
| FI | 20011434 | 1/2003 |
| GB | 2 190 147 | 11/1987 |
| WO | WO 2090015 A1 * | 11/2002 |
| WO | 03/004822 | 1/2003 |
| WO | WO 2005080051 A1 * | 9/2005 |

* cited by examiner

*Primary Examiner*—Brian D. Nash
(74) *Attorney, Agent, or Firm*—Drinker Biddle & Reath LLP (57) ABSTRACT

An impact device includes a frame to which a tool is connectible, and a stress element that is supported on the frame and disposed between the frame and the tool. A hydraulic control system leads pressurized hydraulic fluid into and out of a hydraulic fluid space such that the stress element causes a stress pulse in the tool. The hydraulic control system includes a rotatingly installed control valve that has control openings for intermittently leading the hydraulic fluid out from the hydraulic fluid space.

17 Claims, 8 Drawing Sheets

IMPACT DEVICE WITH A ROTABLE CONTROL VALVE

CROSS-REFERENCES TO RELATED APPLICATIONS

The present application is a continuation application of International Application No. PCT/FI2004/000082 filed Feb. 23, 2004 and published in English as WO 2004/073933 A1 on Sep. 2, 2004, which application claims the benefit of priority to Finnish Application No. 20030261 filed Feb. 21, 2003.

BACKGROUND OF THE INVENTION

The invention relates to an impact device for generating a stress pulse in a tool, the impact device comprising a frame to which the tool is connectible, and between the frame and the tool a transmission member, such as a transmission piston, the tool being in contact with the tool-side end of the transmission member either directly or indirectly at least part of the time during the generation of the stress pulse, means for generating a force between the frame and the transmission member such that the force tends to push the transmission member towards the tool, and a first hydraulic fluid space on the tool-side relative to the transmission member, whereby the transmission member comprises a first pressure surface located on the side of the first hydraulic fluid space towards the tool, means for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, and a hydraulic fluid channel for feeding pressurized hydraulic fluid into the impact device, and a discharge channel for leading the hydraulic fluid out of the impact device.

The invention further relates to a control valve for controlling the work cycle of a hydraulic fluid-driven impact device, a feed channel leading to the impact device and, correspondingly, a discharge channel for leading hydraulic fluid into and out of the impact device, the control valve being intended to be installed rotatingly in a space in a frame of the impact device, at least one hydraulic fluid discharge channel leading to said space, the control valve comprising at least one channel or opening for controlling the flow of hydraulic fluid.

In known impact devices, impacts are achieved by using a reciprocating percussion piston, whose movement is typically achieved hydraulically or pneumatically or in some cases also electrically or by the use of a combustion engine as the power source. A stress pulse is generated in the tool when the percussion piston impacts on the end of the tool or a shank connected thereto.

The impact mechanism of the impact device can also be implemented by using a special stress element to generate an impact pulse. Such a stress element may be a mechanical one-element or multi-element piece subjected to stress in the longitudinal direction of the tool, or hydraulic fluid, arranged in a pressurized state in some space. In these solutions, the stress element is subjected to stress or pressure, respectively, and, at the same time, directly or indirectly pushed against the end of the tool or a shank connected thereto. Hereinafter, in the present patent application and in the claim, the definition 'stress element' refers to both a mechanic solution and a solution implemented with hydraulic fluid. Correspondingly, the definition 'subjected to stress' refers to both subjecting a mechanical piece to mechanical stress and to subjecting hydraulic fluid to pressure. When these are suddenly released from stress or, correspondingly, the pressure is suddenly allowed to drop, the result is the generation of a stress pulse that is transferred to the tool and that way, through the tool, to the material to be broken. In order for a sufficiently strong stress pulse to be generated, the release of the stress element from stress or pressure has to occur rapidly. On the other hand, the stress has to be achieved in a manner enabling high stresses and high pressures without any limits set by mechanical wear or material load. Consequently, in practice, the stress phase or the pressure of the stress element is raised simplest by the use of a hydraulic medium or hydraulic medium-driven piston and valve structures. To ensure a sufficiently high hydraulic fluid flow in the impact phase at a sufficient speed to achieve the required fast pressure release, the control valve controlling the impacts has to be able to control sufficiently large liquid flows at a sufficiently high frequency.

BRIEF DESCRIPTION OF THE INVENTION

The object of the present invention is to achieve an impact device and a control valve for efficient implementation of the generation of a stress pulse by means of a stress element, the control of the impacts of the impact device also being simple. The impact device of the invention is characterized in that the means for leading hydraulic fluid out of the first hydraulic fluid space comprise a rotatingly installed control valve having control channels/openings for leading the hydraulic fluid intermittently from the first hydraulic fluid space to the discharge channel, and that the control valve has several parallel control channels/openings that substantially simultaneously open a connection between the first hydraulic fluid space and the hydraulic fluid discharge channel, respectively. The control valve of the invention is characterized in that the control valve comprises a plurality of parallel channels or openings, which, as the control valve is rotating, alternately simultaneously open a connection from the impact device to the discharge channel and close the connection to the discharge channel, respectively.

The essential idea of the invention is that a rotating valve is employed in the impact device as the control valve for controlling the hydraulic fluid flow to and from the hydraulic fluid space used for stressing the stress element; the valve comprising first control channels for releasing the pressure of the hydraulic fluid loading the stress element in a manner allowing energy to be transferred from the stress element to the tool as a stress pulse. Furthermore, the essential idea of a preferred embodiment of the invention is that the control valve comprises second control channels for coupling the hydraulic fluid pressure to the stress element alternately with pressure release. The essential idea of a second preferred embodiment of the invention is that it comprises separate auxiliary valves for controlling the feed of hydraulic fluid to the stress element and the release of the hydraulic fluid from the stress element, respectively, the rotating valve being coupled to control the control pressure fed to the auxiliary valves. The essential idea of a third preferred embodiment of the invention is that separate sliding seals preferably adjustable by means of the hydraulic fluid pressure are employed and provided with channels for leading the flow of hydraulic fluid to and from the control channels. The essential idea of yet a fourth preferred embodiment of the invention is that the rotating valves are provided with a plurality of parallel control channels that substantially simultaneously open and, correspondingly, close the flow of hydraulic fluid in one or both directions.

An advantage of the invention is that the speed of rotation of the rotating valve is adjusted to, control the impact frequency. The use of suitably designed channels of a suitable size in the control valve enables the adjustment of the speed of the feed and release of the hydraulic fluid. The use of spindle-like auxiliary valves allows particularly the release speed to be raised still higher, resulting in an increase in the rising speed and the magnitude of the stress pulse. The advantage of still another embodiment of the invention is that the use of several parallel control channels allows a large cross-sectional area of the flow to be opened, enabling the efficient implementation of the rapid pressure drop required particularly for the generation of a stress pulse. The advantage of another preferable embodiment of the invention is that the use of sliding seals adjustable with hydraulic medium enables the elimination of viscous friction and the reduction of the friction surface between the valve and the frame, resulting in less wear and quite a low driving power required by the valve.

BRIEF DESCRIPTION OF THE FIGURES

In the following, the invention will be described in detail in the accompanying drawings, in which FIGS. 1a and 1b schematically show a cross-section of an impact device comprising some embodiments of the invention provided with a rotating control valve, FIG. 2 schematically shows an embodiment for rotating the control valve and for adjusting its speed of rotation, FIGS. 5a to 5c show a sectional side view of another impact device according to the invention in its different operations stages, and, in greater detail, an auxiliary valve related to this embodiment, FIGS. 6a to 6c schematically show embodiments of rotating valves suitable for the impact device of the invention, and their sealing relative to the frame of the impact device.

DETAILED DESCRIPTION OF THE INVENTION

Figure 1A:
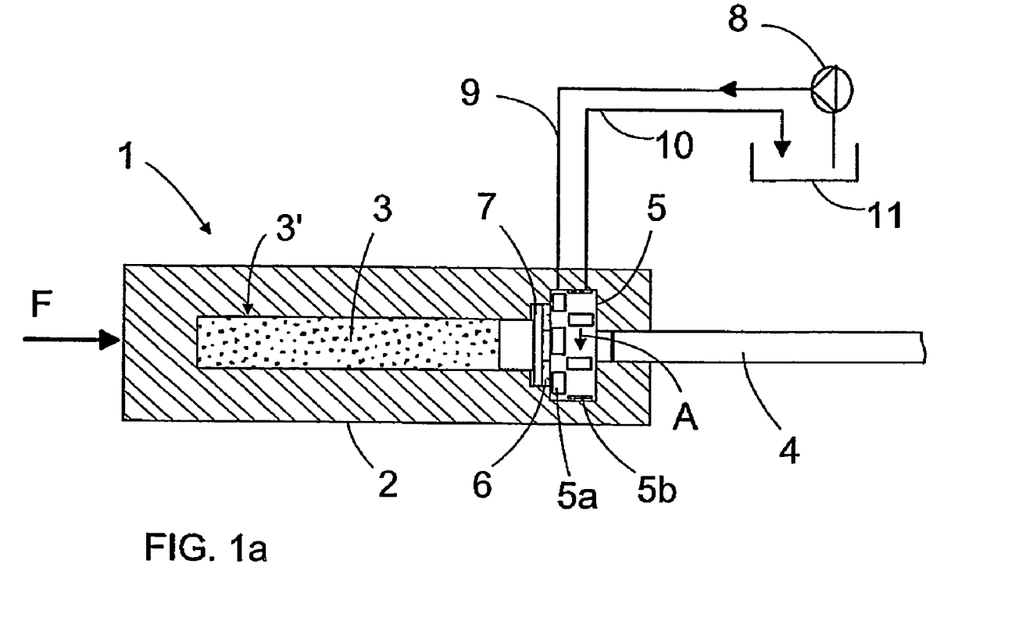
Figure 2:
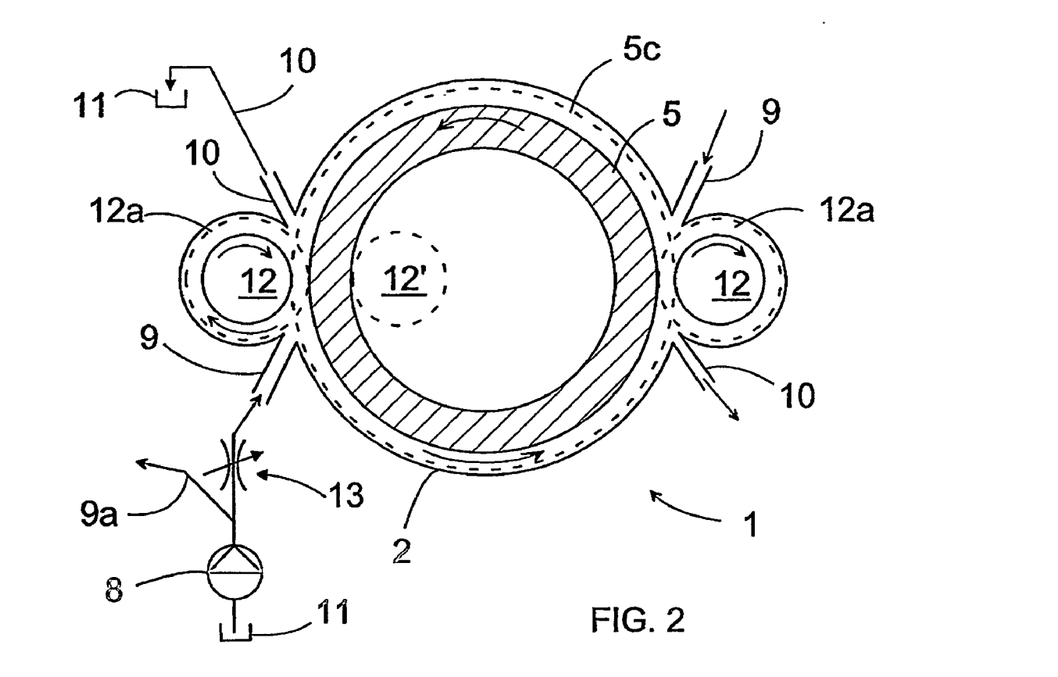

FIG. 1a is a schematic sectional view of an impact device 1 according to the invention, comprising a frame 2 and a stress element 3 therein. The stress element is located coaxially with a tool 4, one end of the stress element 3 being supported to the frame 2 during impacts and, correspondingly, the opposite end to the end of the tool 4 or a shank fastened thereto and known per se. Coaxially with the stress element 3 and, therefore also with the tool 4, is provided a rotatingly installed control valve 5, which is rotated around its axis with a suitable rotating mechanism or turned rotatingly back and forth. One such rotating mechanism is shown in FIG. 2. FIG. 1 further shows a first hydraulic fluid space 6 in the frame 2 of the impact device, and a transmission member, for instance a transmission piston 7 in the hydraulic fluid space, which are used to stress the stress element 3 and, correspondingly, released by means of the rotating valve 5. The transmission piston 7 comprises a first pressure surface located towards the first hydraulic fluid space 6. For stressing the stress element 3, a hydraulic fluid feed channel 9 leads from a pump 8 to the point of openings 5a serving as control channels of the valve 5 and leading, by way of example, through the valve 5, whereby the openings 5a arrive, one at a time, at the hydraulic fluid feed channel 9 and allow hydraulic fluid to flow to the hydraulic fluid space 6, thus pushing the piston 7 towards the stress element 3. As a result, the stress element 3 contracts, and energy is charged therein, and a force acting between the frame 1 and the transmission piston is generated that tends to push the transmission piston 7 towards the tool 4. Correspondingly, as the rotating valve 5 rotates forward in the manner shown by arrow A, openings 5b, located alternately with the openings 5a, also acting as hydraulic fluid channels, and, by way of example, leading through the valve 5, arrive, one at a time, at a hydraulic fluid discharge channel 10, allowing hydraulic fluid to flow rapidly from the hydraulic fluid space 6 to a hydraulic fluid tank 11. This, in turn, results in the stress element 3 being released from stress, and the force generated by the stress constricts the tool, the stored energy being transferred as a stress pulse to the tool 4. The figure shows the stress element 3 and the piston 7 separately. Thus, the stress element 3 may be either of solid material or it may consist of hydraulic fluid in a second hydraulic fluid space 3'. The transmission piston 7 thus comprises a second pressure surface located towards the second hydraulic fluid space 3'. When the stress element 3 is of solid material, it may be integrated into the piston 7, whereby they constitute an entity.

Figure 1B:
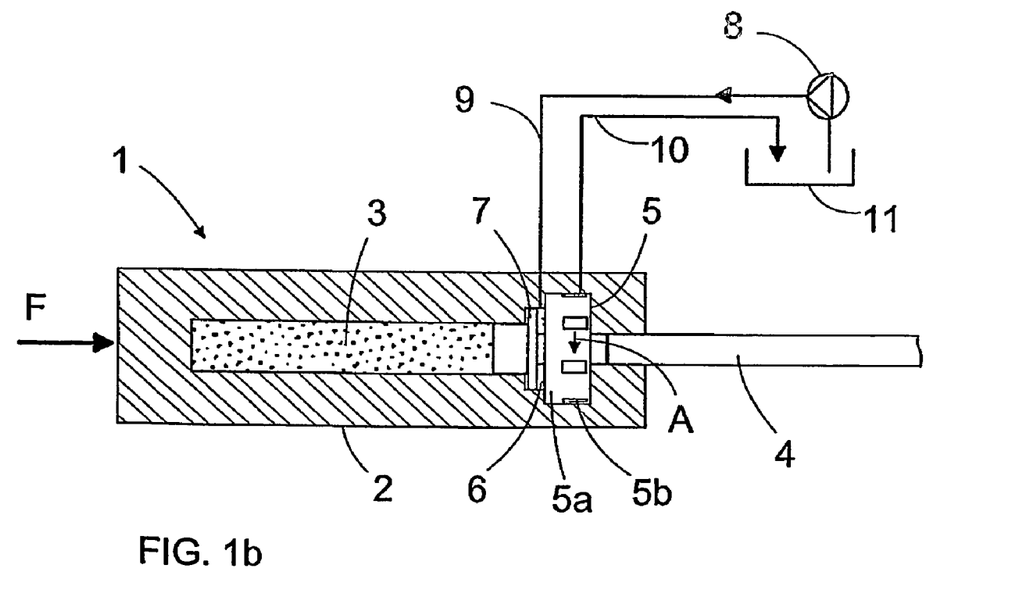

FIG. 1b schematically shows another embodiment of the invention partly in section. This embodiment differs from the one in FIG. 1a in that in this embodiment, the hydraulic fluid feed channel 9 from the pump 8 is directly coupled in communication with the first hydraulic fluid space 6. Furthermore, in this embodiment, the control valve 5 lacks openings 5a, which, in the case of FIG. 1a, would couple the feed channel 9 alternately in communication with the hydraulic fluid space 6 and, correspondingly, would close the communication. Accordingly, in this embodiment, only the release of the hydraulic fluid pressure from the first hydraulic fluid space 6 at suitable intervals for generating the desired stress pulse into the tool 4 is controlled. Otherwise, both structurally and operationally, the solutions of FIGS. 1a and 1b may be similar, and the operation need not be described again in this respect.

FIG. 2 schematically shows a rotating mechanism for rotating a rotating control valve 5. In this embodiment, the control valve 5 is provided with a cogging 5c, and spaces are provided in the frame 2 for a cogwheel 12 that is provided with a cogging similar to that of the cogging 5c and is in contact therewith. The cogwheel 12 is installed rotatingly relative to the frame 2, its cogging 12a making it rotate simultaneously with the control valve 5, but in the opposite direction. To one side of the cogwheel 12 is coupled a hydraulic fluid feed channel 9 and to the other side a discharge channel 10. By the action of the feed of hydraulic fluid via the feed channel 9, the control valve 5 and the cogwheel 12 constitute a gear motor, wherein the hydraulic fluid is able to flow only with the cogging thereof around them, the mutually compatible cogs preventing the flow between them. Accordingly, the cogwheel 12 and the control valve 5 rotate in a manner making the coupling point of their cogging move towards the hydraulic fluid feed channel 9 at the same time as hydraulic fluid flows around them and is discharged through the discharge channel 10. For adjustment of the speed of rotation, a throttle or flow regulator, herein schematically shown coupled to the feed channel 9, can be coupled either to the feed channel or to the discharge channel. The regulator 13 may be either an adjustable throttle or a more complex flow regulator that regulates the amount of the hydraulic fluid flow irrespective of its pressure and thus, more accurately, the speed of rotation of the control valve 5. In addition, a second hydraulic fluid feed channel 9a can lead from the hydraulic fluid pump 8 to another actuator for driving it. In addition to one cogwheel, a plurality of cogwheels can be employed to rotate the control valve 5, provided the hydraulic fluid feed and discharge channels are coupled to both sides of the gear motor composed by each cogwheel 12 and the control valve 5. FIG. 2 generally shows, by dashed lines and designated by numeral 12, a cogwheel placed inside the control valve 5. It is naturally also possible to use a separate rotator motor or another suitable rotating mechanism, such as an electric or pneumatic motor, for rotating the control valve 5.

Figure 3A:
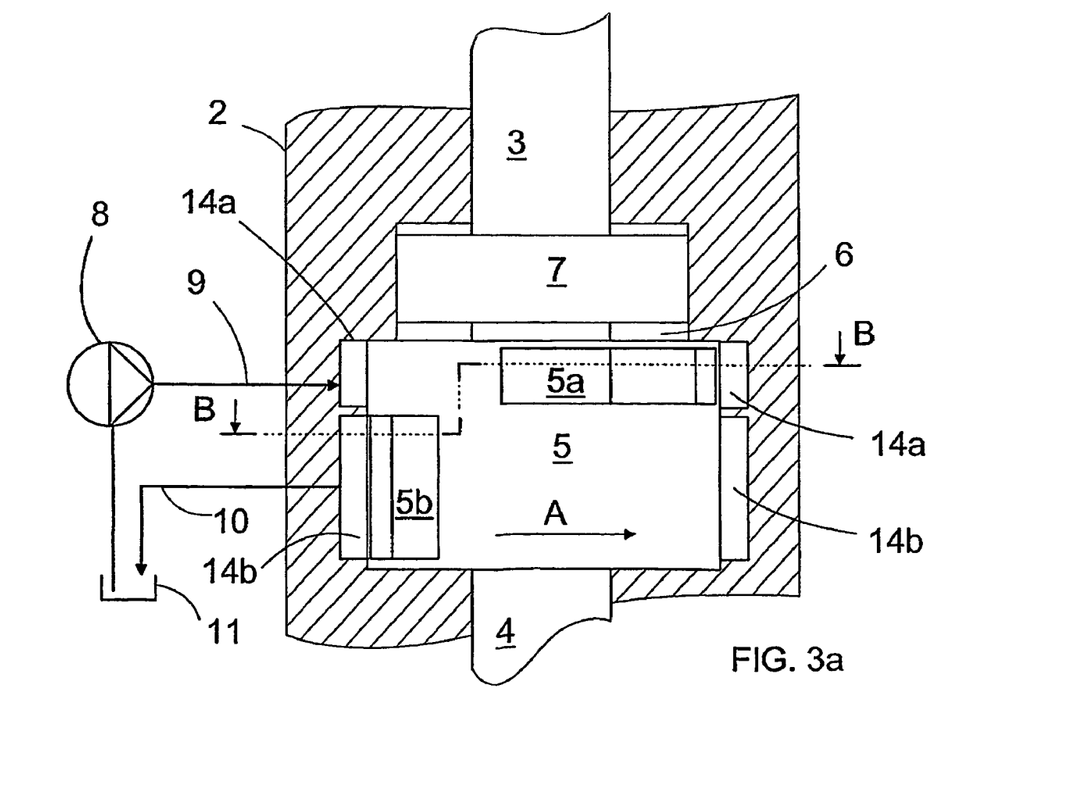
FIGS. 3a and 3b are schematic sectional partial side views of an impact device comprising embodiments according to the invention of the rotating control valve of FIG. 1a and FIG. 1b, respectively.

FIG. 3a shows a detail of an impact device, partly as a sectional side view, including an embodiment of a rotating control valve in accordance with the invention. The operation of this embodiment corresponds to the operation of the impact device schematically shown by FIG. 1a. The control valve 5 rotates in the direction indicated by arrow A, hydraulic fluid channels 9 and 10 leading thereto. The hydraulic fluid channels end in feed and discharge chambers 14a and 14b, of each of which two are shown by way of example, i.e. one on both sides of the control valve. In practice there are several feed and discharge channels, as are feed and discharge openings in the control valve. The control valve 5 comprises feed and discharge openings 5a and 5b that extend through the cylindrical frame, act as hydraulic fluid channels, lead through the wall of the cylindrical frame of the control valve 5, and are located such in the direction of rotation of the valve that they move in succession in time at the point of the feed and discharge chambers 14a and 14b, respectively. This enables alternate feed of hydraulic fluid to and from the hydraulic fluid space 6. This is as such described in FIGS. 4a to 4c.

Figure 3B:
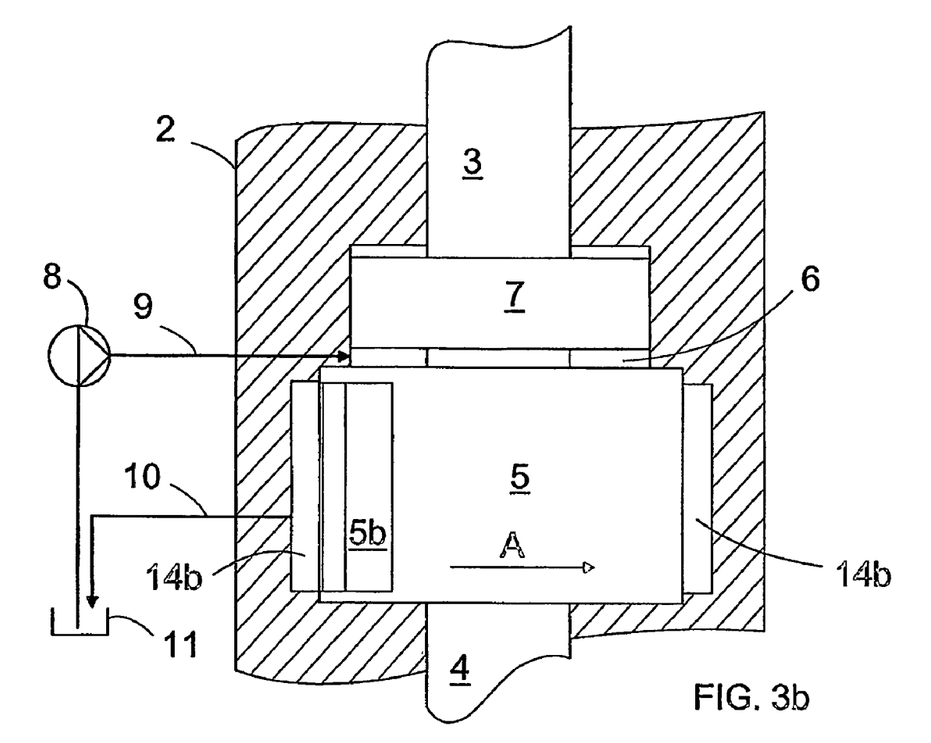

FIG. 3b is a sectional partial side view of still another detail of an impact device, comprising an embodiment of a rotating control valve in accordance with the invention. Its operation corresponds to the operation of the impact device schematically shown in FIG. 1b, but the difference as compared with the solution of FIG. 3a is that the hydraulic fluid feed channel 9 is directly coupled to the hydraulic fluid space 6, whereby the feed chambers 14a and, correspondingly, the feed openings 5a in the control valve 5 are missing. Furthermore, by way of example, the size of the discharge openings 5b and the discharge chambers 14b in the axial direction is larger, which, however, by definition, is not necessary.

Figure 4A:
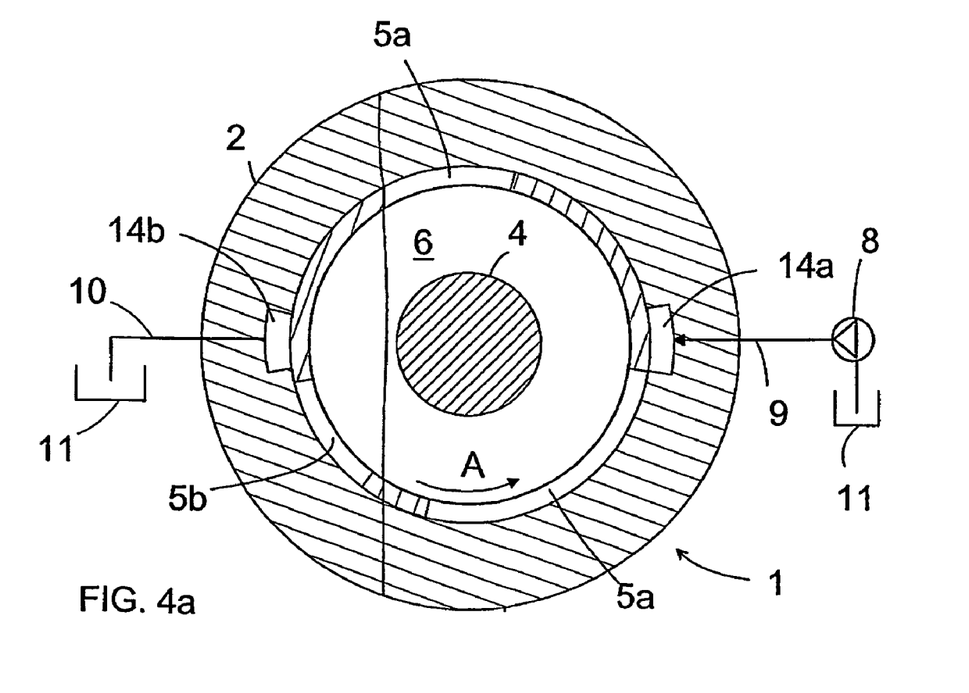
FIGS. 4a to 4c are schematic sectional views of the embodiment of FIG. 3a at line B-B, seen axially in its different operational stages.
Figure 4B:
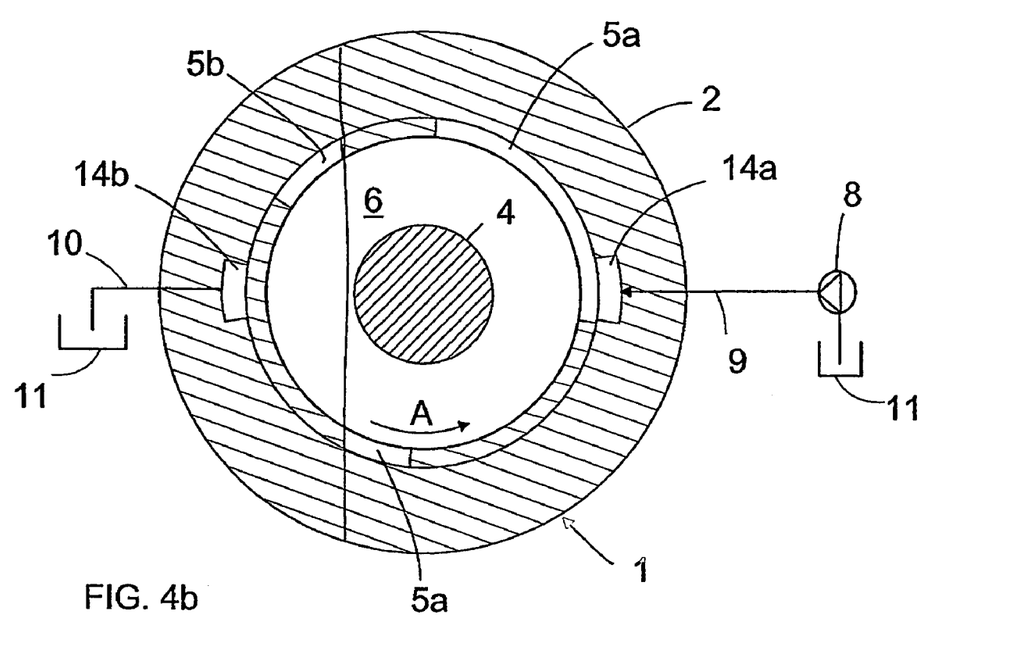
Figure 4C:
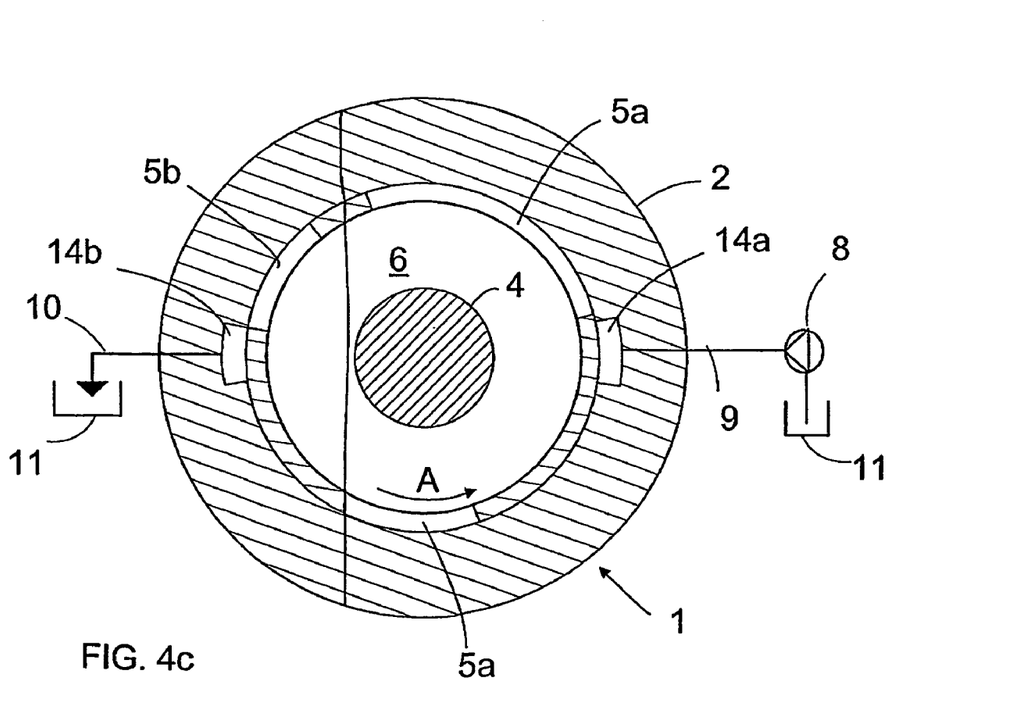

FIGS. 4a to 4c schematically show an impact device with the control valve of FIG. 3a in its three operational stages. In the situation shown in FIG. 4a, as the control valve 5 rotates, the front edge of the opening 5a is placed at the feed chamber 14a, whereby pressurized hydraulic fluid starts to flow from the hydraulic fluid pump 8 via the feed channel 9, as shown by the arrow therein, through the feed chamber 14a and the opening 5a to the hydraulic fluid space 6. The same naturally takes place on the opposite side, wherein the upper opening 5a of FIG. 4a is in a corresponding position relative to the feed chamber 14a on the left side of the frame 2 of the impact device. The openings 5b are not simultaneously at the discharge chambers 14b, and therefore hydraulic fluid cannot be released out of the hydraulic fluid space 6. This way the control valve 5 couples, in the manner shown in FIG. 4a, the hydraulic fluid feed channel in a manner enabling pressurized hydraulic fluid to act on the piston 7 and thereby on the stress element 3 and subject it to stress or pressure. As the control valve 5 continues to rotate, the openings 5a and 5b turn correspondingly, and, in the case shown in FIG. 4b, the end of the stress stage of the stress element is involved, the rear edges of the openings 5a arriving at the feed chambers 14a, and, as the valve continues to rotate, gradually close the connection from the hydraulic fluid feed channel 9 through the chamber 14a and the opening 5a to the hydraulic fluid space 6. In this situation, the discharge of hydraulic fluid from the hydraulic fluid space 6 continues to be shut. In the case shown in FIG. 4c, when rotating, the control valve 5 has proceeded to a situation wherein the feed of hydraulic fluid to the hydraulic fluid space 6 has stopped and the foremost edge of the openings 5b in the direction of rotation has just arrived at the discharge chambers 14b. Since the openings 5b are significantly higher than the openings 5a in the elevation of the control valve 5, hydraulic fluid starts to be released from the hydraulic fluid space 6 through the discharge chamber 14b and the discharge channel 10 quite rapidly, whereby the pressure in the hydraulic fluid space 6 suddenly drops. This being so, the stress element, when suddenly being released, generates a stress pulse through the tool in the manner described above. FIG. 3a shows a situation where only one feed and discharge opening 5a and 5b is seen, but there may be several of them in succession around the rotating control valve 5 depending on both the required amount of hydraulic fluid flow and the flow rate, as is schematically shown in FIG. 1 and FIGS. 4a to 4c. The faster the control valve 5 is rotated, the larger is the frequency of the stress pulses, i.e. the so-called impact frequency generated through the tool. Although FIG. 3a shows substantially rectangular feed and discharge openings, their shape may be any shape known per se.

The functional description shown in FIGS. 4a to 4c is suitable as such also for the operation of the embodiment of FIG. 3b as regards the release of hydraulic fluid pressure. As regards hydraulic fluid pressure feed, the operation is such that hydraulic fluid is fed all the time to the hydraulic fluid space 6 from the pump 8, whereby, when the control valve 5 is in a position that closes the communication through the discharge openings 5b to the discharge channel 10, the pressure in the hydraulic fluid space 6 rises, causing the stress element to be stressed. In the next stage, when the discharge openings 5b open the discharge path for the hydraulic fluid to the discharge channel 10, the flow takes place on a substantially larger cross-sectional area of the channels relative to the cross-sectional area of the hydraulic fluid feed channel 9. Due to the different cross-sectional areas, new pressurized hydraulic fluid is allowed to flow into the hydraulic fluid space 6 significantly more slowly than is the discharge from there, whereby the pressure in the hydraulic fluid space 6 suddenly sinks and a stress pulse is generated in the tool in a manner corresponding to what was described above. As the communication from the hydraulic fluid space 6 to the discharge channel 10 again breaks, the stress element 3 is again stressed and the operational stages are repeated in succession in the above-described manner.

Figure 5A:
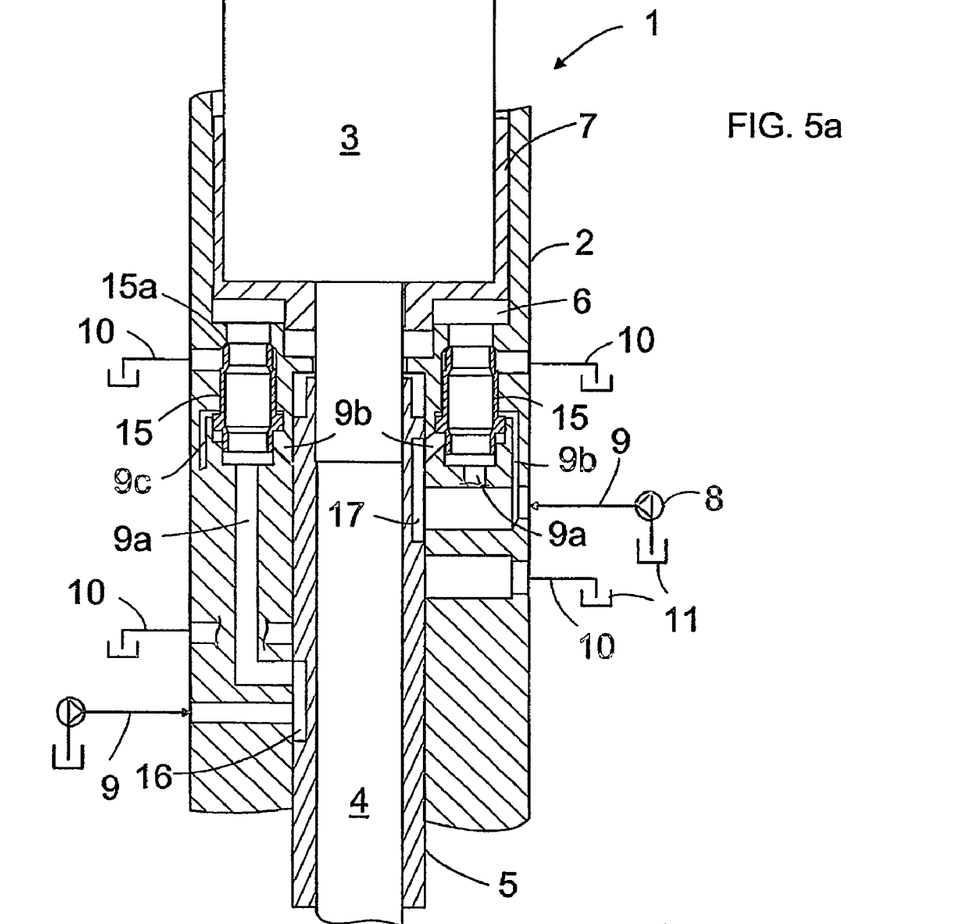
Figures 5B, 6C:
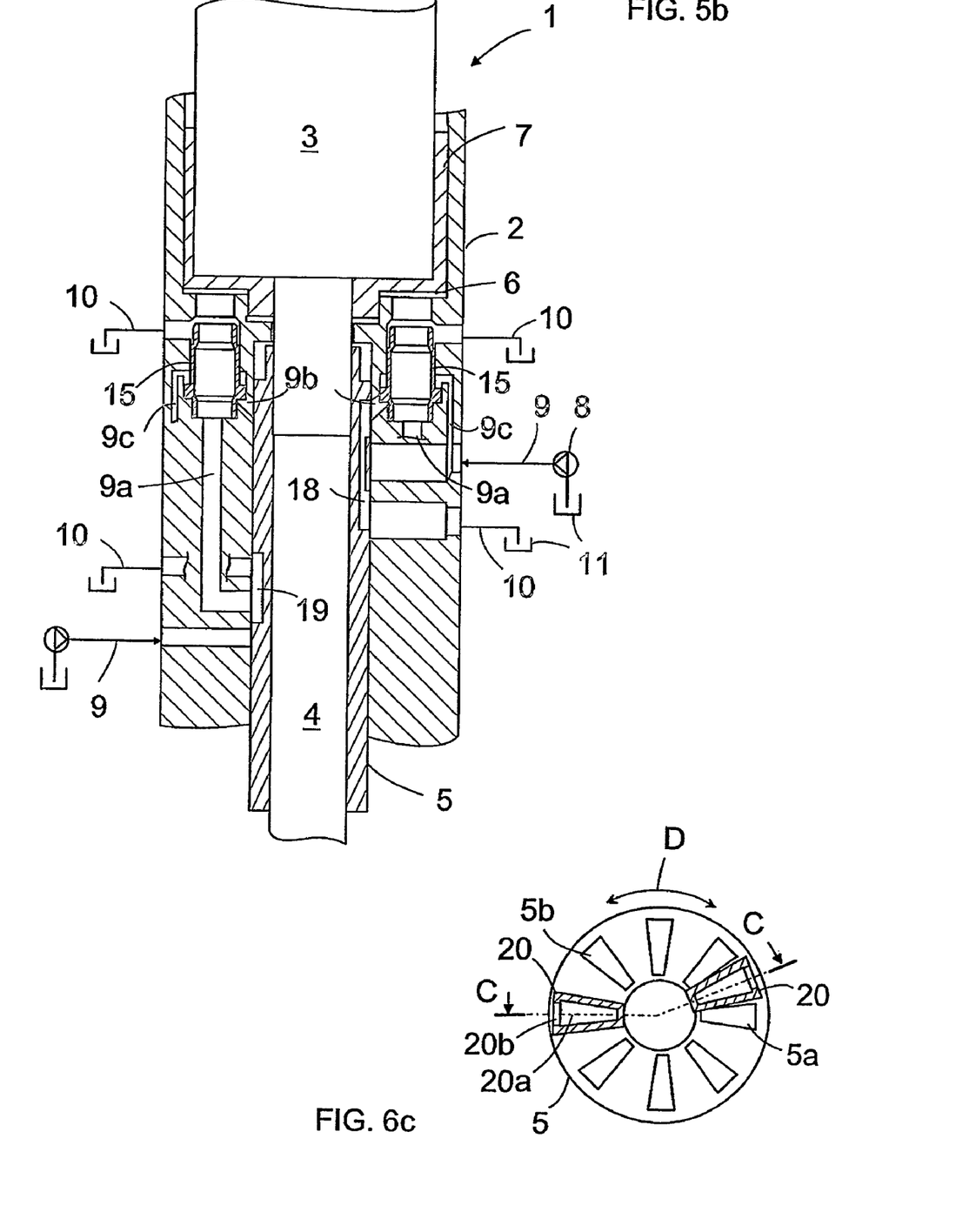
Figure 5C:
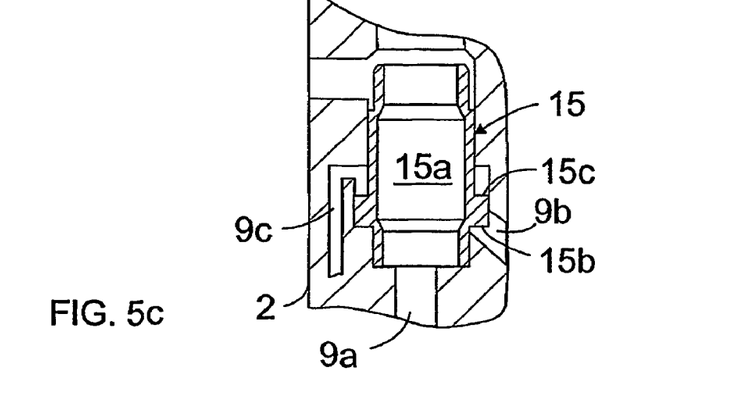

FIGS. 5a to 5c show an embodiment of the invention, wherein separate spindle-like auxiliary valves 15 are used in addition to the rotating control valve 5, the rotating control valve 5 controlling the operation of which, in addition to controlling the hydraulic fluid flow. FIG. 5a is a cross-sectional view of a situation where hydraulic fluid is fed to the impact device for stressing the stress element. The impact device, and the stress element and a working piston composed thereby, are similar in principle and their operation is similar to what is shown in FIGS. 3a and 3b, although they are of different shapes. Furthermore, two or more, e.g. in the way shown by FIGS. 5a to 5b, two spindle-like, by way of example sleeve-like auxiliary valves 15 are installed in the frame 2, which are shown enlarged and in greater detail in FIG. 5c. In practice, as many auxiliary valves preferably exist as there are openings leading to the hydraulic fluid space 6. The auxiliary valves 15 are provided with a through channel 15a and two pressure surfaces 15b and 15c. Hydraulic fluid pressure acts always on the pressure surface 15c of the auxiliary valve via the control channel 9c, the pressure being e.g. normal hydraulic fluid working pressure or the like; and it acts on the auxiliary valve 15 such that its valve tends to shift downwards from the situation shown in FIG. 5a. In the situation shown in FIG. 5a, normal hydraulic fluid pressure acts on the second pressure surface 15b of the auxiliary valve via the control channel 17 and the channel 9b, the pressure generating an opposite force in the auxiliary valve 15, the force being greater than the power generated by the pressure acting on the pressure surface 15c, thus keeping the auxiliary valve 15 in the position shown in FIG. 5a. In this embodiment, the feed and discharge channels of the control valve 5 are merely groove-like control and hydraulic fluid channels on the surface of the control valve 5, and not through openings as shown in FIGS. 3a to 4c. In the situation shown in FIG. 5a, the feed channel 9 leading to the control valve 5 is coupled to the chamber 6 via the hydraulic fluid channel 16, the pressure channel 9a and the channel 15a leading through the auxiliary valve 15, via which the hydraulic fluid gets to flow through the auxiliary valve 15 and act on the stress element 3 via the piston 7, thus generating stress in the stress element 3.

In the situation shown in FIG. 5b, the control valve 5 has rotated to a situation, where the control channel 16 has moved away from the point of the hydraulic fluid channel 9, thus stopping the feed of hydraulic fluid into the chamber 6. Furthermore, the control channel 17 has turned away and been replaced by the control channel 18 that couples the pressure surface 15b of the auxiliary valve 15 into communication with the discharge channel 10. At the same time, the pressure acting on the pressure surface 15b of the auxiliary piston 15 has stopped, whereby the auxiliary piston has moved to the position shown in FIG. 5b, simultaneously opening a direct communication from the piston 7 in the chamber 6 to the hydraulic fluid discharge channel 10. In addition, communication from the chamber 6 is also simultaneously opened to the discharge channel 10 via the channel 15a leading through the auxiliary valve 15, the hydraulic fluid channel 9a and the channel 19. Consequently, hydraulic fluid is allowed to be discharged from the chamber 6 through two parallel ways, and, as a result, the piston 7 is very rapidly released from the pressure that acted thereon, and a rapid stress pulse is generated from the stress element 3 through the tool 4. After this, as the control valve 5 continues to rotate, the process returns to the situation shown in FIG. 5a, and the work cycle restarts.

Figure 6A:
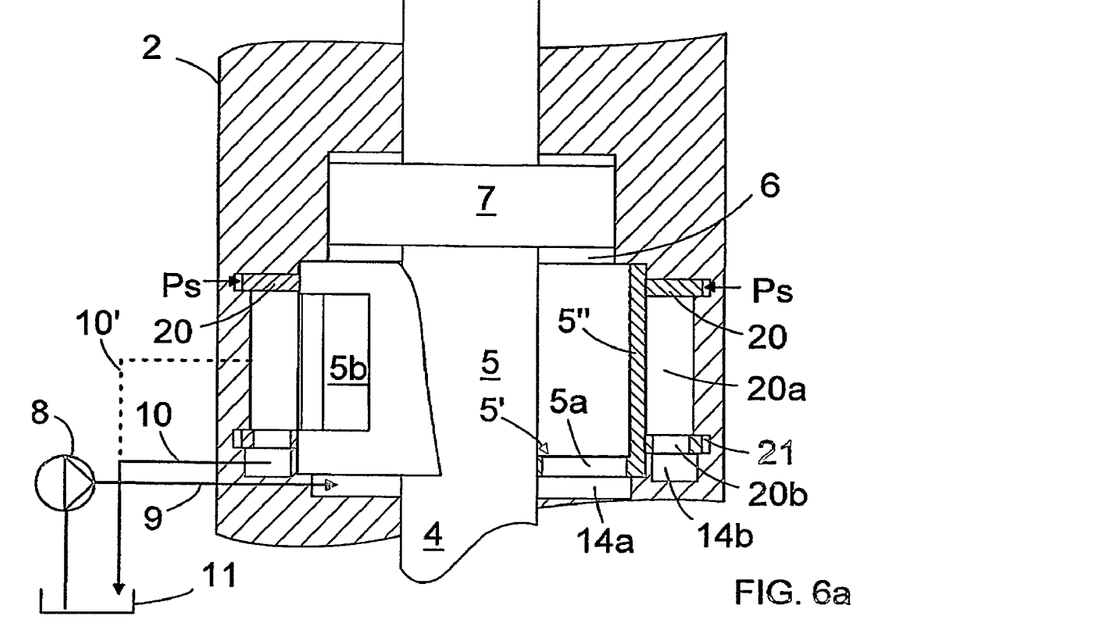
Figure 6B:
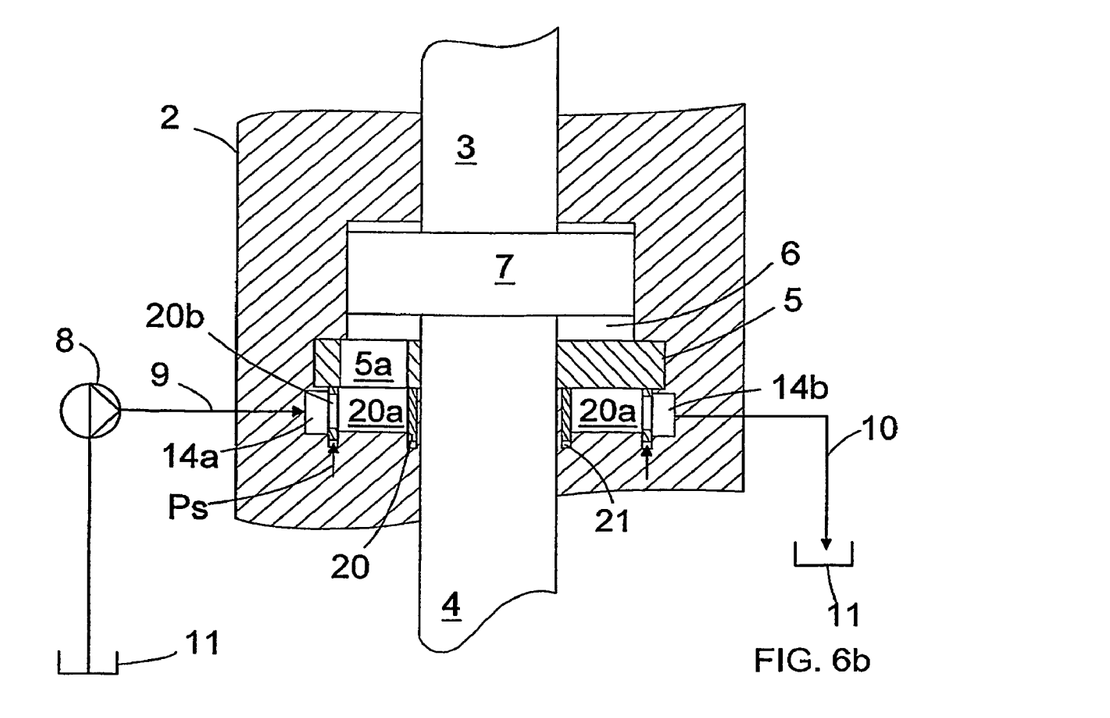

FIGS. 6a to 6c are schematic partial sectional views of some embodiments of rotating valves suitable for the impact device of the invention with related sealing solutions.

FIG. 6a schematically shows an embodiment of a rotating valve, the control valve 5 being provided with both a flange-like part 5' and a sleeve-like part 5", control openings 5a and 5b, respectively, being arranged through both of them. In this embodiment, the openings 5a coupling the hydraulic fluid feed channel 9 and the hydraulic fluid space 6 in communication with each other are placed in the flange-like part 5' of the control valve 5, and, correspondingly, the discharge openings 5b coupling the hydraulic fluid space 6 and the discharge channel 10 in communication with each other are placed in the sleeve-like part 5". In principle, the openings could be coupled vice versa, e.g. the discharge openings 5b in the flange-like part 5' and the feed openings 5a in the sleeve-like part 5". However, in view of the operation of the impact device, it is preferable that the discharge openings 5b are in the sleeve-like part 5", where the peripheral speed is at maximum and, consequently, the opening speed, and, correspondingly, as a result, the rate of rise of the stress pulse are at maximum. FIG. 6a also shows a seal structure for sealing the clearances between the control valve 5 and the frame 2. By way of example, the seal structure is shown only sealed by the sleeve-like part 5" of the control valve 5, but the sealing of the flange-like part 5' can be implemented in a corresponding manner by applying the principle of the solution shown in 6b.

The solution shown in FIG. 6a comprises a seal 20 situated in a space 21 and able to move in said space in the radial direction of the valve 5. Hydraulic fluid pressure Ps acts on the seal 20 on the surface opposite relative to the valve 5 in a manner pushing the seal towards the valve 5 at the desired force. The seal 20 also comprises a channel 20a, which is coupled through an opening 20b leading through the wall of the seal 20 to the discharge channel 10 leading from the hydraulic fluid discharge chamber 14b. The connection from the channel 20a in the seal 20 can also be coupled in another manner, such as directly through the frame 2, as shown with dashed line 10'. Adjustment of the pressure Ps, enables adjustment of the clearance between the surfaces of the seal 20 and the control valve 5. Pressure adjustment can be implemented using a separate external adjustment pressure, or it can be coupled e.g. dependant on the pressure level of the rotator motor of the control valve 5, the feed pressure of the impact device etc., whereby pressure variations in the hydraulic fluid spaces 6 due to leakages can adjust the adjustment of the sealing piece relative to the control valve for an optimum clearance, enabling a very small leakage of hydraulic fluid between the seal 20 and the control valve 5. At the same time, this takes care of lubrication between the surfaces.

FIG. 6b shows, in a corresponding manner, a flange-like control valve, wherein both the feed and discharge openings 5a and 5b are placed through the flange-like part in the direction of the axis of rotation of the valve 5. In this embodiment, the openings 5a and 5b are in succession in the circumferential direction, as shown in FIG. 6c. Alternatively, the feed and discharge openings 5a and 5b may be placed at different points in the radial direction relative to the flange-like valve part, whereby, in a more preferred embodiment, the discharge openings are located closer to the periphery in the radial direction to achieve as rapid a pressure release as possible. In a corresponding embodiment of FIG. 1b, where only the hydraulic fluid pressure release is controlled, i.e. hydraulic fluid is discharged from the hydraulic fluid space 6 to the discharge channel 10, the discharge openings 5b alone are sufficient, the size and location of which can be selected accordingly. FIG. 6b shows sealing solutions, corresponding to the embodiment of FIG. 6a and placed on the cross-section of the valve 5 to seal the openings corresponding to FIG. 6a. Herein the same principles also apply, and no separate description is therefore required. Correspondingly, this seal solution shown by FIG. 6b can be applied to sealing the openings of the flange part 5' of the embodiment according to FIG. 6a together with the seal solution for sealing the sleeve-like part 5". The sealing may also be effected by coupling the sealing pressure to act on the valve 5 in the axial direction, the seals being fixedly or rigidly coupled to the frame or the valve or being part of either.

FIG. 6c shows the valve 5 and the seals 20 of the embodiment of FIG. 6b seen from under relative to FIG. 6b. FIG. 6b, in turn, is a section in the direction of line C-C shown in FIG. 6c, although FIG. 6c does not show all the details shown in the section of FIG. 6b. FIG. 6c shows a control valve 5 provided with successive openings 5a and 5b in the circumstantial direction for guiding hydraulic fluid to and from the hydraulic fluid space. Furthermore, FIG. 6c shows two seals 20 for illustrating the structure of the seals. As FIG. 6c shows, the openings of the seals are preferably substantially of the same shape as the openings 5a and 5b in the valve to achieve a maximally effective hydraulic fluid flow. The openings 5a and 5b are placed such that between them, as the control valve 5 turns or rotates, the enclosed point between the openings of the control valve closes the communication to the openings until the channel opens the next time letting hydraulic fluid flow to or from the previously mentioned hydraulic fluid space 6. FIG. 6c further shows, by two-way arrow D, that, if desired, the control valve 5 is able to rotate also by a reciprocating movement, if it is considered advantageous for constructive reasons. Correspondingly, if desired, the valves shown also in the other figures can operate by a reciprocating rotational movement instead of a continuous rotational movement in the same direction.

Figures 7, 8:
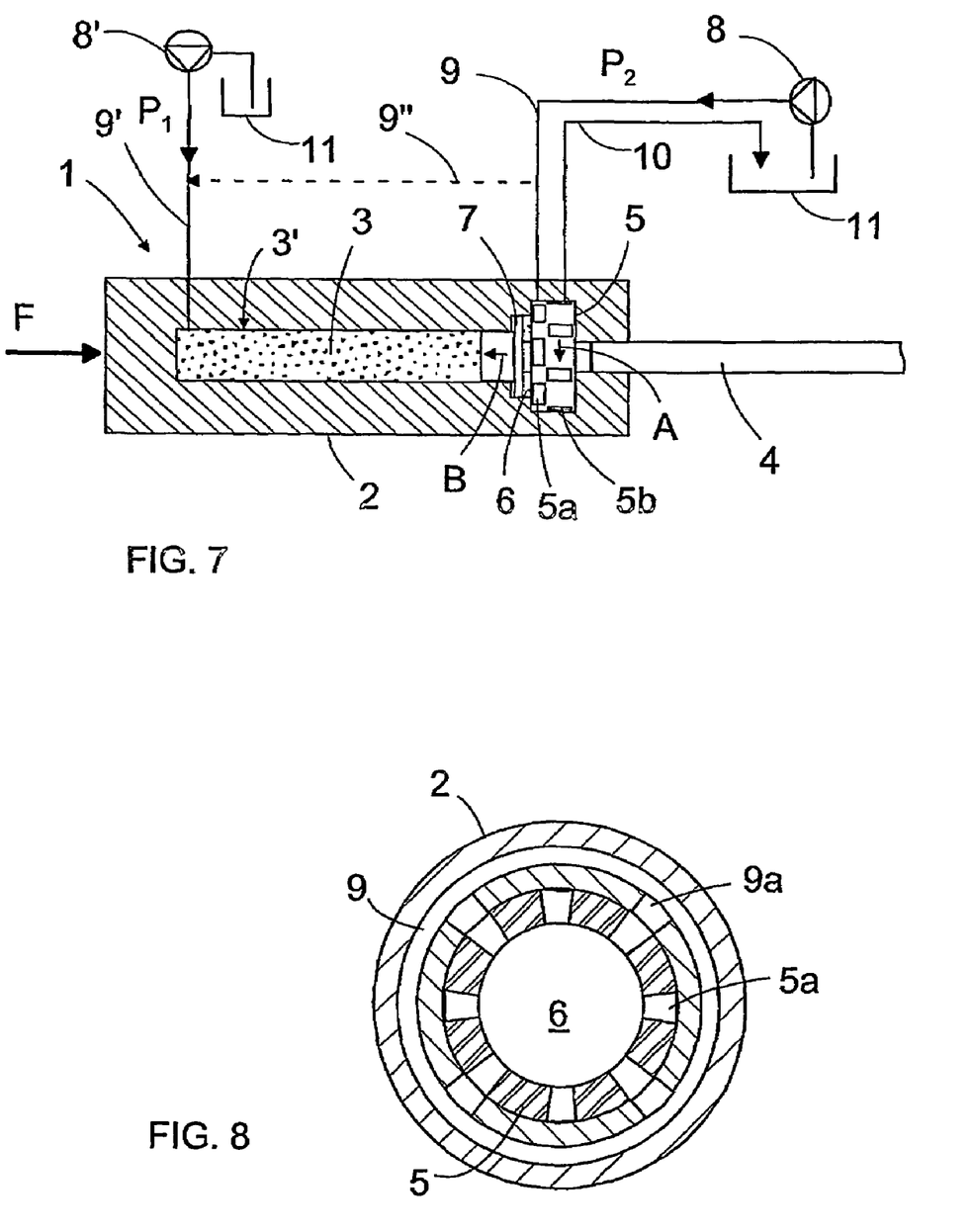
FIG. 7 schematically shows an embodiment of the impact device according to the invention.
FIG. 8 schematically shows yet another embodiment of the impact device according to the invention.

FIG. 7 schematically shows a principled embodiment of the impact device according to the invention. FIG. 7 shows the impact device in a case where it is 'charged' in order to provide a stress pulse. The figure shows an impact device 1 comprising a frame 2. The frame has as the stress element 3 a second hydraulic fluid space 3' containing hydraulic fluid, the space being limited on one side by a transmission piston 7 functioning as the transmission member. The second hydraulic fluid space is coupled via a channel 9' in communication with a pressure source, such as a hydraulic fluid pump 8', which feeds pressurized hydraulic fluid into the first hydraulic fluid space at a pressure $P_1$. On one side of the transmission piston 7, i.e. on the side opposite to the second hydraulic fluid space 3', there is the first hydraulic fluid space 6, which, in turn, is coupled via the channel 9 and the valve 5 in communication with a hydraulic fluid source, such as the hydraulic fluid pump 8, which feeds pressurized hydraulic fluid whose pressure is $P_2$. From the valve 5, the hydraulic fluid return channel 10 leads further to the hydraulic fluid tank 11. Further, it may comprise a hydraulic accumulator coupled in communication with the second hydraulic fluid space 3' to attenuate the pressure pulses. Instead of two hydraulic fluid pumps 8 and 8', one common hydraulic fluid pump 8 can be used, indicated by a broken line 9".

In the case of FIG. 7, so-called charging is carried out, whereby hydraulic fluid is fed, controlled by the valve 5, into the first hydraulic fluid space 6 such that the transmission piston 7 moves in the direction of arrow B, until it has reached its rear position, i.e. the uppermost position in FIG. 7. At the same time, hydraulic fluid is discharged from the second hydraulic fluid space. The rear position of the transmission piston 7 is determined by mechanical solutions in the impact device 1, for example different shoulders and stoppers, and in the embodiment of FIG. 7a shoulder 2a and the rear surface of the of the transmission piston flange 7a. During the operation of the impact device, the impact device 1 is pushed towards the material to be treated at a force F, i.e. at what is called feed force, which keeps the transmission piston 7 in contact with the tool 4, and its tip, i.e. drill bit or the like, in contact with the material to be treated. When the transmission piston 7 has moved in the direction of arrow B as far as possible, the valve 5 is rotated into a position which enables sudden flow of the hydraulic fluid out of the first hydraulic fluid space 6 into the hydraulic fluid tank 11. This allows the transmission piston 7 to protrude in the direction of the tool 4 due to the effect of the force generated by the pressure of the hydraulic fluid present in the second hydraulic fluid space and additionally flowing into it from the hydraulic fluid pump 8'. The pressure $P_2$ affecting the transmission piston 7 in the second hydraulic fluid space provides a force which pushes the transmission piston 7 in the direction towards the tool 4, which compresses the tool 4. As a result, sudden compressive stress is generated in the tool 4 via the transmission piston 7, which then generates a stress pulse through the tool 4 as far as to the material to be treated. What is called a reflection pulse reflected from the material to be treated returns, in turn, back through the tool 4, pushing the transmission piston 7 again in the direction of arrow B, whereby the energy of the stress pulse is transferred to the hydraulic fluid in the second hydraulic fluid space. Simultaneously, the valve 5 is returned to such a position that hydraulic fluid is again fed into the first hydraulic fluid space 6 to push the transmission piston 7 into its rear position, i.e. impact position.

FIG. 8 shows yet an embodiment of the impact device according to the invention. The figure schematically shows a rotating control valve 5 comprising several channels 5a for leading hydraulic fluid into the hydraulic fluid space 6. Around the control valve 5, there is the frame 2 of the impact device having an annular feed channel 9 for hydraulic fluid, shown by way of example. Several parallel and, by way of example, radial feed channels 9a lead from the feed channel 9 to the control valve 5, the number of the feed channels 9a being by way of example half of the number of channels 5a of the control valve 5. Thus, when the control valve 5 rotates, hydraulic fluid is fed into the hydraulic fluid space 6 at double frequency, because half of the channels 5a at a time become in communication with the feed channel 9. Correspondingly, of course, the hydraulic fluid space 6 must be similarly positioned in communication with the discharge channel by means of a corresponding number of channels in order for the generation of stress pulses to take place at said double frequency.

In order for the multiplication of the frequency to take place, only the other half needs to have the number of channels corresponding to the multiplication according to an integer. Thus, the number of feed channels 9a may be equal to the multiplication in the frame, i.e. for example twofold compared with the channels 5a of the control valve 5. Correspondingly, the number of discharge channels may be equal to the multiplication, for instance twofold, in the control valve 5, whereas the number of channels may be smaller outside the control valve 5 in the frame 2. Further, the number of channels in both directions may be the same in the control valve 5 and, on the other hand, in the frame 2, in which case one has the same smaller number of channels and, correspondingly, the other has a greater number of channels equal to the multiplication by the integer.

In addition to channels formed radially, also axially directed parallel channels may naturally be used, or both may be used at the same time.

The invention is described above in accordance with the example of the drawings, and is in no way limited thereto. It is essential that a revolvingly installed control valve, whose rotation or turning speed maybe adjustable for achieving the desired impact frequency, be used for controlling such an impact device provided with a stress element.

The invention claimed is:

1. An impact device for generating a stress pulse in a tool, the impact device comprising:
   a frame to which the tool is connectible;
   a transmission member disposed between the frame and the tool, the transmission member including:
      a transmission piston defining a first pressure surface; and
      a tool-side end being in contact with the tool either directly or indirectly at least part of the time during the generation of the stress pulse;
   a stress element generating a force between the frame and the transmission member such that the force tends to push the transmission member towards the tool;
   a first hydraulic fluid space disposed on a tool-side relative to the transmission member and partially defined by the first pressure surface; and
   a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
      a hydraulic fluid channel for feeding pressurized hydraulic fluid into the impact device;
      a discharge channel for leading the hydraulic fluid out of the impact device; and
      a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel, wherein the control valve includes:
         a second set of control openings for intermittently leading the hydraulic fluid from the hydraulic fluid channel to the first hydraulic fluid space; and
         several parallel control channels which simultaneously open a connection between the hydraulic fluid channel and the first hydraulic fluid space in such a way that the connection from the hydraulic fluid channel to the first hydraulic fluid space and, correspondingly, from the first hydraulic fluid space to the discharge channel open alternatively.

2. An impact device for generating a stress pulse in a tool, the impact device comprising:
   a frame to which the tool is connectible;
   a transmission member disposed between the frame and the tool, the transmission member including:
      a transmission piston defining a first pressure surface; and
      a tool-side end being in contact with the tool either directly or indirectly at least part of the time during the generation of the stress pulse;
   a stress element generating a force between the frame and the transmission member such that the force tends to push the transmission member towards the tool;
   a first hydraulic fluid space disposed on a tool-side relative to the transmission member and partially defined by the first pressure surface; and
   a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
      a hydraulic fluid channel for feeding pressurized hydraulic fluid into the impact device;
      a discharge channel for leading the hydraulic fluid out of the impact device; and
      a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel;
   wherein the stress element includes a second hydraulic fluid space full of hydraulic fluid and partially defined by the transmission member, and the transmission piston defines a second pressure surface located towards the second hydraulic fluid space.

3. An impact device as claimed in claim 2, wherein the second hydraulic fluid space is defined by the frame and the transmission piston, which is subjected to stress by feeding pressurized hydraulic fluid into said first hydraulic fluid space and released from stress by enabling a sudden flow of the hydraulic fluid out of said first hydraulic fluid space such that the stress energy stored in the hydraulic fluid of the second hydraulic fluid space is discharged to the tool as an axial stress pulse.

4. An impact device as claimed in claim 2, further comprising:
   a pressure source coupled in fluid communication with the second hydraulic fluid space.

5. An impact device as claimed in claim 4, wherein the pressure source comprises a hydraulic fluid pump.

6. An impact device for generating a stress pulse in a tool, the impact device comprising:
   a frame to which the tool is connectible;
   a transmission member disposed between the frame and the tool, the transmission member including:
      a transmission piston defining a first pressure surface; and
      a tool-side end being in contact with the tool either directly or indirectly at least part of the time during the generation of the stress pulse;
   a stress element generating a force between the frame and the transmission member such that the force tends to push the transmission member towards the tool;

a first hydraulic fluid space disposed on a tool-side relative to the transmission member and partially defined by the first pressure surface; and a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
  a hydraulic fluid channel for feeding pressurized hydraulic fluid into the impact device;
  a discharge channel for leading the hydraulic fluid out of the impact device; and
  a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel, wherein the control valve is installed to continuously rotate in a single direction.

7. An impact device for generating a stress pulse in a tool, the impact device comprising:
  a frame to which the tool is connectible;
  a transmission member disposed between the frame and the tool, the transmission member including:
    a transmission piston defining a first pressure surface; and
    a tool-side end being in contact with the tool either directly or indirectly at least part of the time during the generation of the stress pulse;
  a stress element generating a force between the frame and the transmission member such that the force tends to push the transmission member towards the tool;
  a first hydraulic fluid space disposed on a tool-side relative to the transmission member and partially defined by the first pressure surface; and
  a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
    a hydraulic fluid channel for feeding pressurized hydraulic fluid into the impact device;
    a discharge channel for leading the hydraulic fluid out of the impact device; and
    a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel, wherein the control valve is rotated by a hydraulic fluid-driven motor.

8. An impact device as claimed in claim 7, wherein the hydraulic fluid-driven motor comprises a gear motor and the gear motor is constituted by a cogging on the control valve and a separate cogwheel in rotating connection with the cogging, and the hydraulic fluid channel and, correspondingly, discharge channel on opposite sides of their point of contact.

9. An impact device as claimed in claim 8, wherein the hydraulic fluid-driven motor comprises at least two gear motors constituted by a cogging on the control valve and the hydraulic fluid channel and, correspondingly, the discharge channel on opposite sides of their points of contact.

10. An impact device as claimed in claim 7, wherein speed of rotation of the control valve, and thus impact frequency and release speed of the impact device, is adjustable.

11. An impact device for generating a stress pulse in a tool, the impact device comprising:
  a frame to which the tool is connectible;
  a transmission member disposed between the frame and the tool, the transmission member including:
    a transmission piston defining a first pressure surface; and
    a tool-side end being in contact with the tool either directly or indirectly at least part of the time during the generation of the stress pulse;
  a stress element generating a force between the frame and the transmission member such that the force tends to push the transmission member towards the tool;
  a first hydraulic fluid space disposed on a tool-side relative to the transmission member and partially defined by the first pressure surface; and
  a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
    a hydraulic fluid channel for feeding pressurized hydraulic fluid into the impact device;
    a discharge channel for leading the hydraulic fluid out of the impact device;
    a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel; and
    at least one separate auxiliary valve coupled to be controlled by rotation of the control valve such that when hydraulic fluid is fed into the first hydraulic fluid space, each auxiliary valve closes the connection from the hydraulic fluid space to the discharge channel and, correspondingly, when the hydraulic fluid is allowed to flow away from the first hydraulic fluid space, opens the connection from the hydraulic fluid space to the discharge channel.

12. An impact device as claimed in claim 11, wherein the at least one separate auxiliary valve comprises a spindle-like valve.

13. An impact device as claimed in claim 12, wherein the at least one separate auxiliary valve comprises a sleeve-like valve through which hydraulic fluid flows from the hydraulic fluid channel through the first set of control openings of the control valve to the first hydraulic fluid space.

14. An impact device as claimed in claim 13, wherein part of the hydraulic fluid discharged from the first hydraulic fluid space flows correspondingly through the auxiliary valve and further through the first set of control openings of the control valve to the discharge channel.

15. An impact device for generating a stress pulse in a tool, the impact device comprising:
   a frame to which the tool is connectible;
   a transmission member disposed between the frame and the tool, the transmission member including:
      a transmission piston defining a first pressure surface; and
      a tool-side end being in contact with the tool either directly or indirectly at least part of the time during the generation of the stress pulse;
   a stress element generating a force between the frame and the transmission member such that the force tends to push the transmission member towards the tool;
   a first hydraulic fluid space disposed on a tool-side relative to the transmission member and partially defined by the first pressure surface; and
   a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
      a hydraulic fluid channel for feeding pressurized hydraulic fluid into the impact device;
      a discharge channel for leading the hydraulic fluid out of the impact device; and
      a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel; and
      seals adjustable with hydraulic medium and arranged between the control valve and the frame of the impact device, the seals include channels through which the hydraulic fluid is led at least through the discharge channel.

16. An impact device for generating a stress pulse in a tool, the impact device comprising:
   a frame to which the tool is connectible;
   a transmission member disposed between the frame and the tool, the transmission member including:
      a transmission piston defining a first pressure surface; and
      a tool-side end being in contact with the tool either directly or indirectly at least part of the time during the generation of the stress pulse;
   a stress element generating a force between the frame and the transmission member such that the force tends to push the transmission member towards the tool;
   a first hydraulic fluid space disposed on a tool-side relative to the transmission member and partially defined by the first pressure surface; and
   a hydraulic control system for leading pressurized hydraulic fluid into said first hydraulic fluid space and for enabling sudden flow of the hydraulic fluid out of said first hydraulic fluid space such that said force between the frame and the transmission member causes, either directly or indirectly via the transmission member and when the transmission member is in contact with the tool, a force compressing the tool in its longitudinal direction and, due to the effect thereof, a stress pulse in the tool in its axial direction, the hydraulic control system including:
      a hydraulic fluid channel for feeding pressurized hydraulic fluid into the impact device;
      a discharge channel for leading the hydraulic fluid out of the impact device; and
      a rotatingly installed control valve having a first set of control openings for leading the hydraulic fluid intermittently from the first hydraulic fluid space to the discharge channel, and the first set of control openings substantially simultaneously open a connection between the first hydraulic fluid space and the hydraulic fluid discharge channel;
   wherein hydraulic fluid is fed from a hydraulic fluid pump through the hydraulic fluid channel to the rotating control valve and, correspondingly, from the control valve through the discharge channel to a hydraulic fluid tank, and wherein each of the hydraulic fluid and discharge channels comprise parallel hydraulic fluid channels and discharge channels, respectively, and that a number of openings in the first set of openings of the rotating control valve and the number of parallel hydraulic fluid and discharge channels, respectively, leading to the control valve are multiplied in accordance with the same integer.

17. An impact device according to claim 16, wherein the number of openings in the first set of openings of the control valve is the number of hydraulic fluid channels as multiplied by an integer or vice versa and, correspondingly, with regard to the number of discharge channels, as multiplied by the same integer or vice versa.

* * * * *